United States Patent [19]

Fazio et al.

[11] Patent Number: 4,730,718
[45] Date of Patent: Mar. 15, 1988

[54] BI-DIRECTIONAL TRANSFER MECHANISM

[75] Inventors: Rosario Fazio, Perth Amboy, N.J.; James L. Frank, Grand Haven, Mich.

[73] Assignee: Ermanco Incorporated, Spring Lake, Mich.

[21] Appl. No.: 922,194

[22] Filed: Oct. 23, 1986

[51] Int. Cl.⁴ .................................. B65G 47/46
[52] U.S. Cl. ...................... 198/372; 198/597; 198/817
[58] Field of Search ............ 198/348, 362, 366, 370, 198/575, 597, 457, 570, 577, 372, 367, 371, 436, 437, 790, 414, 415, 412; 209/521

[56] References Cited

U.S. PATENT DOCUMENTS

| | | | |
|---|---|---|---|
| 2,778,474 | 1/1957 | Koning | 198/19 |
| 2,986,261 | 5/1961 | Wenstrand | 198/21 |
| 3,104,004 | 9/1963 | Poel et al. | 198/20 |
| 3,179,234 | 4/1965 | Bloom et al. | 198/105 |
| 3,592,333 | 7/1971 | Sullivan et al. | 198/129 |
| 3,621,971 | 11/1971 | Daniels et al. | 198/21 |
| 3,651,922 | 3/1972 | Ross et al. | 198/127 |
| 3,679,043 | 7/1972 | Becker | 198/105 |
| 3,822,777 | 7/1974 | Jepsen | 198/31 AB |
| 3,828,917 | 8/1974 | Oestergren | 198/127 R |
| 3,921,789 | 11/1975 | Coldinger et al. | 198/31 AB |
| 3,973,672 | 8/1976 | Frost | 198/436 X |
| 4,174,774 | 11/1979 | Bourgeois | 198/457 |
| 4,256,222 | 3/1981 | Gunti | 198/457 |
| 4,319,675 | 3/1982 | Turnbough | 198/790 X |
| 4,346,799 | 8/1982 | Dunville et al. | 198/367 |
| 4,625,855 | 12/1986 | Klaus | 198/367 |

Primary Examiner—Robert J. Spar
Assistant Examiner—Jennifer Doyle
Attorney, Agent, or Firm—Lockwood, Alex, FitzGibbon & Cummings

[57] ABSTRACT

The present invention relates to a bi-directional transfer mechanism which is driven by the drive shaft of a conveyor system. The transfer mechanism includes a pair of vertically displaceable lift tables with a conveying member reeved thereon such that the conveying member is driven in one direction on the first lift table and in a different direction on the second lift table. By selectively displacing the first and second lift tables between an engaging position whereby the conveying member is displaced above the conveying surface of the conveyor system and a non-engaging position whereby the conveying member is displaced below the conveying surface of the conveyor system, the transfer mechanism can transfer articles in two directions.

28 Claims, 7 Drawing Figures

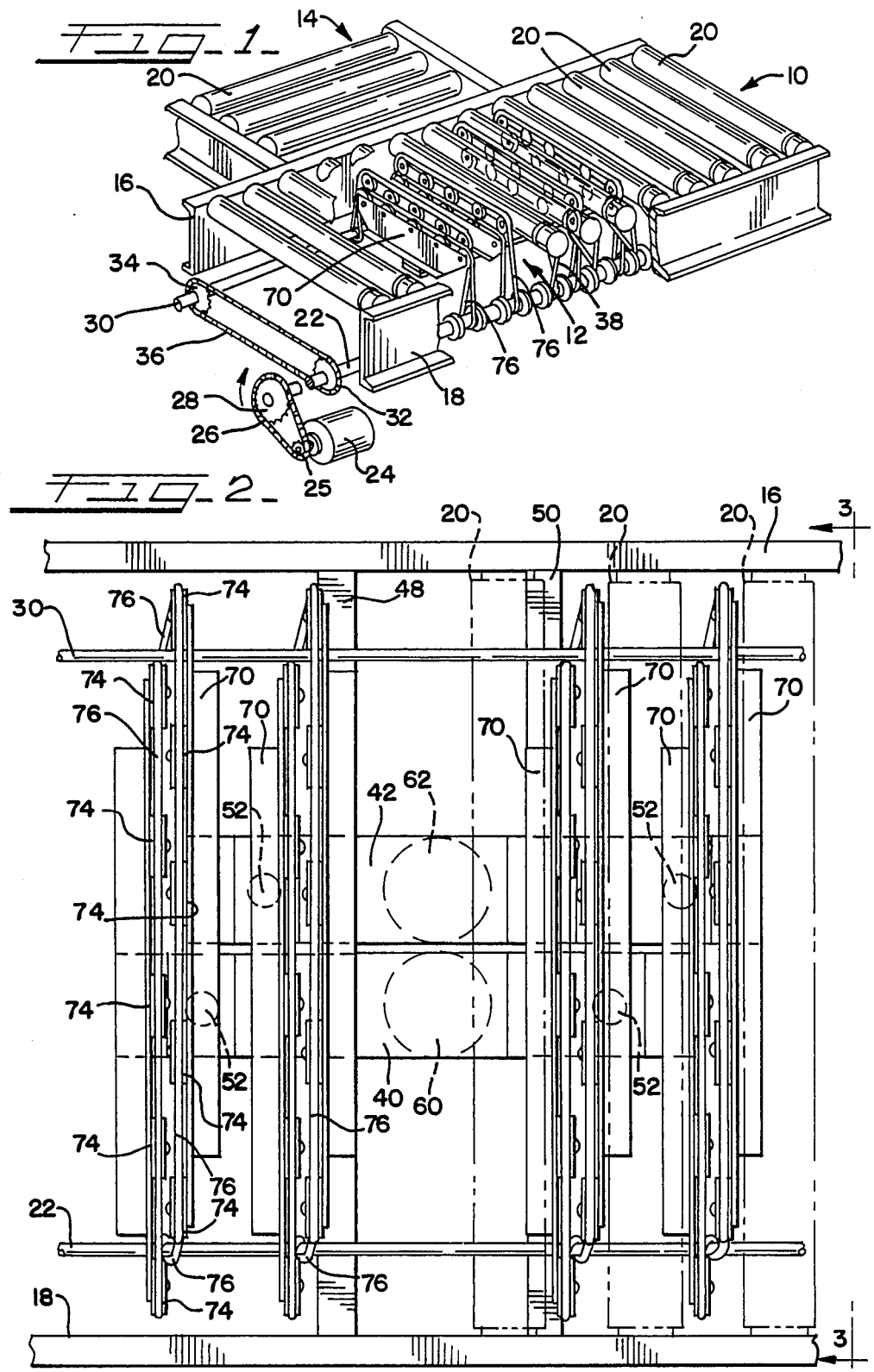

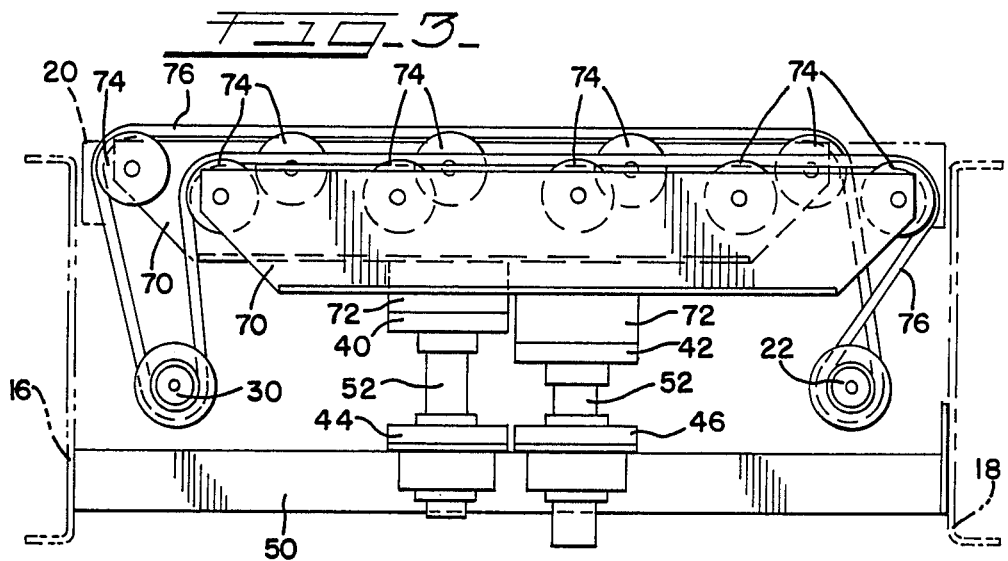
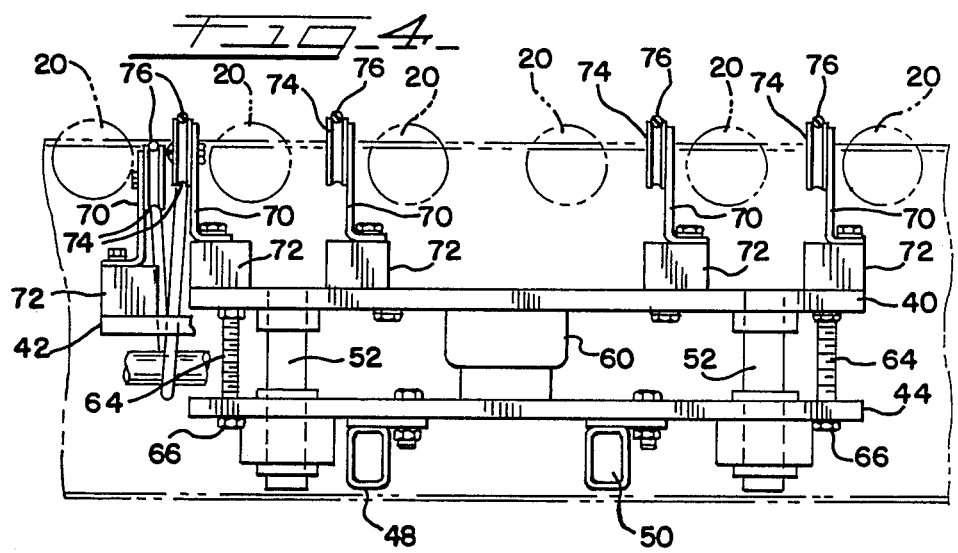

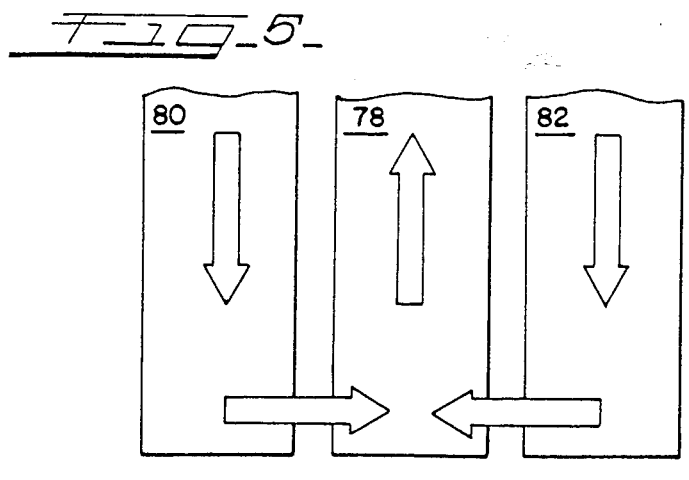
FIG_5_
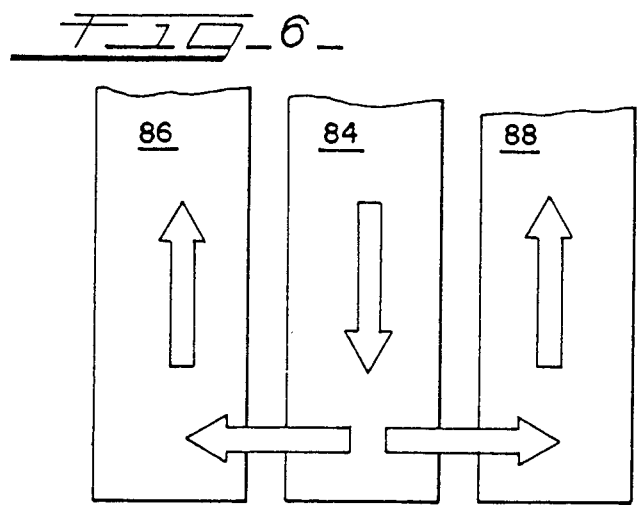
FIG_6_
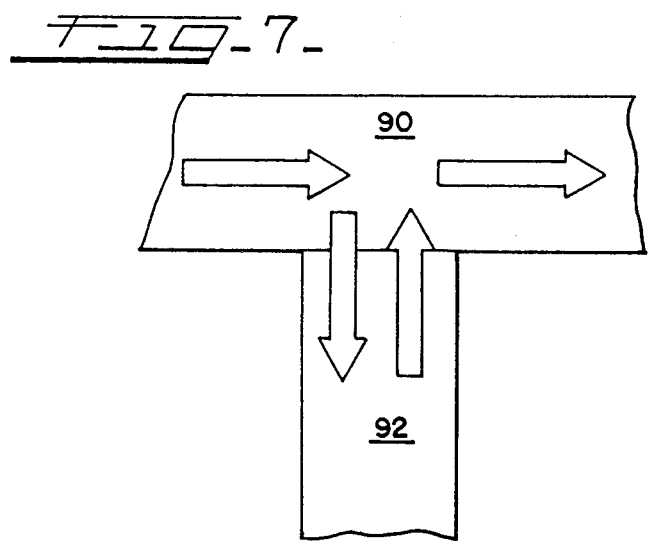
FIG_7_

BI-DIRECTIONAL TRANSFER MECHANISM

BACKGROUND AND SUMMARY OF INVENTION

The present invention relates generally to a transfer mechanism for use with live roller line shaft conveyors and, more particularly, to an improved bi-directional transfer mechanism which is driven by the drive shaft of a live roller conveyor.

Bi-directional transfer mechanisms for transferring articles from one conveyor pass line to another are well known in the art. In general, conventional devices of the type similar to the present invention utilize one or more conveying members of some type which are supported for rotation transverse to the pass line of the conveyor. These conveying members are typically located between the rollers of the conveyor and are positioned parallel thereto on a support structure capable of vertical movement. In the prior art, the conveying member is driven by a drive system comprising a motor, which is used solely for driving the transfer mechanism, and some type of sprocket or gear system.

In its non-transfer position, the conveying member of the prior art bi-directional transfer mechanisms is positioned below the conveying surface or pass line of the conveyor. When a transfer operation is desired, the support structure is displaced upward until the conveying member is displaced sufficiently above the pass line of the conveyor so as to transfer the desired article. While the support structure is being displaced, the transfer drive motor is energized in the appropriate direction so as to drive the conveying member in the desired direction.

Prior art bi-directional transfer mechanisms of the type described above have been characterized by problems and disadvantages which desirably could be eliminated. For example, these transfer mechanisms require motors which are solely dedicated to driving the transfer mechanism. The present invention eliminates the need for additional motors because the conveying members are driven by the conveyor drive shaft, which is always rotating while the live roller conveyor is in operation. By eliminating the transfer drive motor, the conveyor system and transfer mechanisms require less maintenance. Additionally, because the transfer mechanism does not use its own motor, there is less likelihood that an entire conveyor system will have to be shut down or modified because a transfer mechanism is not working properly.

Likewise, in order to transfer articles in more than one direction, prior art transfer mechanisms reversed the movement of the conveying member and thus required a more sophisticated control system than that of the present invention. In order to reverse the movement of the conveying member, prior art control systems had to change the direction of rotation of the motor or use some other means to change the direction of rotation of the conveying member. As a result, the control system not only had to control the vertical displacement of the support structure, but also control the direction of rotation of the conveying member. In the present system, because the direction of article transfer is controlled by the vertical displacement of the lift tables, the control system must only control the vertical displacement of the lift tables. Thus, a less sophisticated and thus less expensive control system may be utilized.

The present invention operates to overcome the foregoing problems and disadvantages by providing a bi-directional transfer mechanism is which the endless conveying member is driven by the conveyor drive shaft and conveyor drive motor. The conveying member is rotatably mounted on guide means located on first and second vertically displaceable lift tables. The conveying member is reeved around the guide means and the conveyor drive shaft such that it is driven in one direction on the guide means of the first lift table and driven in the opposite direction on the guide means of the second lift table. Lift means for selectively displacing the first and second lift tables between a transfer position and a non-transfer position is also provided. In the transfer position, the lift table guide means is displaced such that the endless conveying member is raised above the conveying surface of the conveyor. In the non-transfer idle position, the lift table guide means is displaced such that the endless conveying member is positioned below the conveying surface. By selectively displacing the desired lift table, transfer of articles in two desired directions can be effected.

It is, therefore, a general object of the present invention to provide a bi-directional transfer mechanism having an improved drive system.

Another object of the present invention is to provide a bi-directional transfer mechanism of the type in which the conveying member is driven by the conveyor line shaft and conveyor drive motor.

A further object of the present invention is to provide a bi-directional transfer mechanism of the type in which the conveying member is reeved around guide means mounted on first and second lift tables such that the conveying member is driven in one direction on the guide means of the first lift table and is driven in the opposite direction on the guide means of the second lift table during the operation of the conveyor.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a perspective view of the conveyor system incorporating the bi-directional transfer mechanism of the present invention, with portions thereof broken away in order to better show the invention;

FIG. 2 is a top plan view of the transfer mechanism of FIG. 1 in which three rollers of a conveyor are shown in phantom;

FIG. 3 is a side elevational view of the transfer mechanism taken along line 3—3 of FIG. 2 with certain parts removed and one of the lift tables of the transfer mechanism positioned in a transfer position and the other lift table positioned in an idle position;

FIG. 4 is a front elevational view of one lift table and its fixed frame interacting with a fragmented portion of a second lift table and with the rollers of a conveyor shown in phantom;

FIG. 5 is a diagrammatic view illustrating a transfer option onto the center conveyor with the transfer mechanism of FIG. 1 mounted thereon.

FIG. 6 is a diagrammatic view illustrating a transfer option off the center conveyor with the transfer mechanism of FIG. 1 mounted thereon.

FIG. 7 is a diagrammatic view illustrating a transfer option on and off a uni-directional conveyor with the transfer mechanism of FIG. 1 mounted thereon.

DETAILED DESCRIPTION OF THE PREFERRED EMBODIMENT

Referring to the drawings and in particular to FIG. 1, a main live roller line shaft conveyor is indicated generally at 10. A bi-directional transfer mechanism incorporating the principles of the present invention, indicated generally at 12, is incorporated into the conveyor 10 so as to allow the transfer of articles between main conveyor 10 and an auxillary conveyor 14 which is positioned adjacent to main conveyor 10.

Conveyor 10 includes a frame having sidewall members 16 and 18 which rotatably support a plurality of individually powered transverse rollers 20. The upper surface of the individual rollers 20 are disposed on a common plane to define a pass line along which conveyed articles (not shown) are propelled. Auxillary conveyor 14 may be similarly constructed.

A drive shaft 22 is positioned beneath the pass line and aligned parallel to both sidewall 18 and the pass line. In the illustrated embodiment, drive shaft 22 is of solid construction and driven by a suitable motor 24 operatively connected thereto in a conventional manner such as, for example, by a chain and sprocket drive. Small sprocket 25 mounted on the motor shaft drives chain 26 which drives shaft 22 by means of a large sprocket 28 mounted thereon. Although a chain and sprocket drive is preferred, numerous other drive systems for driving shaft 22 may also be utilized. Drive shaft 22 is generally continuous and supported by conventional shaft bearings (not shown) mounted in a plurality of spaced apart locations which extend along conveyor sidewall 18. In the illustrated embodiment, a slave shaft 30 is driven by drive shaft 22 and is constructed and mounted similarly thereto. Drive shaft 22 operatively engages slave shaft 30 by means of a chain and sprocket drive comprised of a pair of sprockets 32 and 34 fixedly mounted to drive shaft 22 and slave shaft 30 respectively and a chain 36 interconnecting the two sprockets.

As shown in FIG. 1, rollers 20 are driven by small endless elastomeric belts or O-belts 38 as shown in U.S. Pat. No. 3,650,375. Various methods of transmitting power from drive shaft 22 to the rollers 20 are known and the transmission element shown in the illustrated embodiment is merely an example.

In the illustrated embodiment of the bi-directional transfer mechanism 12 of the present invention, a pair of lift tables 40 and 42 are mounted for vertical movement on a pair of lift table supports 44 and 46 respectively. Both supports 44 and 46 are fixedly mounted by bolts or other appropriate mounting means to cross members 48 and 50 which extend between sidewalls 16 and 18. Two lift table guide shafts 52 are fixed to and extend downward from the bottom of each lift table 40 and 42. Each lift table support 44 and 46 is provided with a pair of bores positioned and dimensioned so as to slidably receive lift table guide shafts 52. Each lift table 40 and 42 is supported for vertical displacement on its respective support 44 and 46 by a pneumatic lift 60 and 62 respectively. Various other means for vertically displacing the lift tables 40 and 42 are also available such as, for example, gear systems, cams or hydraulic lifts.

Each lift table 40 and 42 is also provided with a pair of stop shafts 64. These shafts 64 extend downward from the bottom of each lift table through an appropriately aligned hole in the respective lift table support 44 and 46. The lower end of stop shafts 64 are provided with threads so as to receive a nut 66 thereon. When the pneumatic lifts 60 and 62 of each lift table 40 and 42 are extended, the lift tables are displaced upward until they reach the end of the stroke of the pneumatic lift or until the nuts 66 located on the end of shafts 64 contact the bottom of table support 44 and 46. Consequently, by adjusting the position of the nut 66, the maximum vertical displacement of each lift table 40 and 42 can be limited.

Referring to FIGS. 2 and 4, in the illustrated embodiment each lift table 40 and 42 is provided with four wheel support angles 70 which are securely mounted to support blocks 72 which in turn are securely mounted to each lift table 40 and 42. As shown in FIG. 3, each support angle 70 is provided with a plurality of transversely spaced idler wheels 74 rotatably mounted thereon. The axes of the idler wheels 74 mounted on each support angle 70 all lie in a plane parallel to the pass line of conveyor 10.

As shown in FIGS. 3 and 4, lift tables 40 and 42 are positioned so that each support angle 70 from lift table 40 is paired with an adjacent support angle 70 from lift table 42 and each pair of support angles 70 is positioned parallel to and between rollers 20 of conveyor 10. The idler wheels 74 which are mounted on each pair of support angles 70 interact to carry a large endless elastomeric belt or O-belt 76 having a circular cross section. As shown in FIG. 3, the belt 76 is reeved around the idler wheels 74 of each pair of adjacent support angles 70, drive shaft 22 and slave shaft 30 such that it is driven in one direction on the idler wheels 74 of lift table 40 and is driven in the opposite direction on the idler wheels 74 mounted on lift table 42. Assuming that drive shaft 22 is being driven in a clockwise direction in FIG. 3, belt 76 is driven from right to left on the upper surface of the idler wheels 74 located on lift table 42 which is shown in the lower or non-transfer position. Belt 76 is driven around slave shaft 30 and up to the idler wheels 74 located on lift table 40 where it is driven from left to right back to drive shaft 22.

In the lower or non-transfer position, shown by lift table 42 in FIGS. 3 and 4, the idler wheels 74 mounted on the support angles 70 are positioned so that elastomeric belt 76 driven thereon is positioned below the conveying surface or pass line of conveyor 10. In the raised or transfer position, shown by lift table 40 in FIGS. 3 and 4, the idler wheels 74 mounted on support angle 70 are displaced so that the elastomeric belt 76 driven thereon is raised above the conveying surface or pass line of conveyor 10. When a lift table 40 or 42 is displaced to its transfer position, the length of the path around drive shaft 22, slave shaft 30 and idler wheels 74 is lengthened which causes elastomeric belt 76 to stretch.

In operation, conveyor motor 24 continuously drives chain 26 which drives sprocket 28 which in turn rotates drive shaft 22. The rotation of drive shaft 22 causes the small elastomeric belts 38 to drive the conveyor rollers 20 in known manner. In addition, the rotation of drive shaft 22 rotates the slave shaft 30 by means of the sprocket and chain assembly described above. Drive shaft 22 and slave shaft 30 continuously drive the large elastomeric belts 76 of the bi-directional transfer mechanism 12. As each elastomeric belt 76 is driven, the portion traveling over the idler wheels 74 of lift table 40 is traveling in one direction transverse to the pass line while the portion of the belt traveling over the idler wheels 74 of lift table 42 is traveling in the generally opposite direction transverse to the pass line.

By extending pneumatic lift 60 of lift table 40, the idler wheels 74 mounted on lift table 40 are displaced such that the portion of large elastomeric belt 76 which is driven over those idler wheels is raised above the pass line, thus presenting this transversely moving surface to the article or articles to be transferred. By retracting the pneumatic lift 60 of lift table 40, articles are then free to pass over the transfer mechanism 12 without engagement thereof. If a transfer in the opposite direction is desired, the pneumatic lift 62 mounted on lift table support 46 is extended forcing lift table 42 upward. As a result, the idler wheels 74 mounted on the support angles 70 of lift table 42 are displaced such that the portion of the elastomeric belt 76 which is driven over those idler wheels is raised above the pass line of the conveyor 10. Because the elastomeric belt 76 travels in the opposite direction over the idler wheels 74 of lift table 42 as compared to lift table 40, articles are then transferred in an opposite direction. By adjusting the nut 66 on the stop shafts 64, the maximum vertical displacement of elastomeric belt 76 above the conveying surface can be adjusted.

FIG. 5 is a diagrammatic view of three parallel conveyors in which the center conveyor 78 would have a bi-directional transfer mechanism 12 of the present invention and the two outer conveyors 80 and 82 would each have a uni-directional transfer mechanism of known type aligned with the bi-directional transfer mechanism at a transfer station. In operation, articles would be conveyed on the outer two conveyors 80 and 82 past the transfer station. As desired, the articles at the transfer station could be transferred one at a time by their respective uni-directional transfer mechanisms to the center conveyor 78. As one uni-directional transfer mechanism is actuated, the appropriate pneumatic lift 60 or 62 of the bi-directional transfer mechanism 12 is extended so as to raise the proper lift table 40 or 42 and thus present the large endless elastomeric belts 76 traveling in the desired direction. The article then passes from the uni-directional transfer mechanism of the outer conveyor 80 or 82 to the elastomeric belts 76 of the bi-directional transfer mechanism 12 of the center conveyor 78. When the article is centered over the center conveyor 78, the extended pneumatic lift 60 or 62 is then retracted so that the article is lowered onto the pass line of center conveyor 78 where it is conveyed thereon. In order to transfer an article from the other outside conveyor 82 or 80 to the center conveyor 78, the uni-directional transfer mechanism 12 of that conveyor is actuated and the other pneumatic lift 62 or 60 of the bi-directional transfer mechanism 12 is extended, thus presenting the elastomeric belt 76 of the bi-directional transfer mechanism 12 traveling in the opposite direction. The remaining portion of the transfer procedure is then repeated as described above and the transfer is carried out as described above.

Similarly, FIG. 6 is a diagrammatic view of three parallel conveyors in which the center conveyor 84 would have a bi-directional transfer mechanism 12 of the present invention and the two outer conveyors 86 and 88 would have a uni-directional transfer mechanism of known type aligned with the bi-directional transfer mechanism at a transfer station. In operation, articles would be conveyed on the center conveyor 84 past the transfer station. As desired, articles at the transfer station could be transferred one at a time from the center conveyor 84 to either of the outside conveyors 86 and 88 by the bi-directional transfer mechanism 12 of the present invention. Depending on which direction the desired transfer is to occur, the appropriate pneumatic lift 60 or 62 of the bi-directional transfer mechanism 12 is extended so as to raise the proper lift table 40 or 42 thus presenting the large endless elastomeric belts 76 traveling in the desired direction. The article then passes off the elastomeric belts 76 of the bi-directional transfer mechanism of the center conveyor 84 and onto the uni-directional transfer mechanism of the appropriate outside conveyor 86 or 88. After the article is no longer in contact with the elastomeric belts 76 of the center conveyor, the extended pneumatic lift 60 or 62 is retracted so that other articles on the center conveyor 84 are free to pass over the transfer mechanism 12 without engagement thereof. If a transfer from the center conveyor 84 to the other outside conveyor 88 or 86 is desired, the other pneumatic lift 62 or 60 of mechanism 12 can be extended and the transfer is effected as described above.

FIG. 7 is a diagrammatic view of FIG. 1 showing a main conveyor 90 which would have the bi-directional transfer mechanism 12 of the present invention and a reversible auxillary conveyor 92 mounted adjacent thereto. In operation, articles would be transferred along main conveyor 90 past auxillary conveyor 92. As desired, articles positioned over the transfer mechanism 12 could be transferred one at a time onto the auxillary conveyor 92 by the transfer mechanism 12. By extending the appropriate pneumatic lift 60 or 62, the proper lift table 40 or 42 is elevated to raise, above the pass line, the portion of the large endless elastomeric belts 76 which is traveling in the desired direction. This portion contacts the article causing it to pass off the elastomeric belts 76 and onto the auxillary conveyor 92. The extended pneumatic lift 60 or 62 is then retracted so that other articles on the main conveyor 90 are free to pass over the transfer mechanism 12 without engagement thereof. When it is desired to transfer the article back onto the main conveyor 90, the direction of article travel on the auxillary conveyor 92 is reversed and the other pneumatic lift 62 or 60 is extended so as to elevate the other lift table 42 or 40 and thus present the large elastomeric belts 76 traveling in the opposite direction. The article is then transferred off the auxillary conveyor 92 and onto the elastomeric belts 76. When the article is centered over the main conveyor 90, the extended pneumatic lift 62 or 60 is retracted so that the article is lowered onto the pass line of the main conveyor 90 where it is conveyed thereon.

It will also be understood that the embodiments of the present invention which have been described herein are merely illustrative of an application of the principles of the invention. Numerous modifications may be made by those skilled in the art without departing from the spirit of the scope of the invention.

What I claim is:

1. A bi-directional transfer mechanism for use with conveyor systems comprising:
   frame means;
   first and second lift tables mounted for vertical movement on said frame means, each of said lift tables having means for guiding a conveying member mounted thereon;

said conveying member being driven by a power source which includes a drive shaft and further operatively engaging said guide means of said first and second lift tables, said conveying member being reeved around said guide means and said drive shaft such that the portion of said conveying member operatively associated with said first lift table is driven in one direction on said guide means of said first lift table and the portion of said conveying member operatively associated with said second lift table is driven in a different direction on said guide means of said second lift table; and, means for selectively positioning said first and second lift tables with respect to each other between respective article engaging and non-engaging positions, whereby one of said lift table guide means is located in said article engaging position such that the portion of said conveying member operatively engaging said one of said lift table guide means is raised above the conveying surface of said conveyor system, while the other of said lift table guide means is located in said article non-engaging position such that the portion of said conveying member operatively engaging said other of said lift table guide means is positioned below said conveying surface.

2. The bi-directional transfer mechanism of claim 1 wherein the portions of said conveying member operatively associated with said first and second lift tables are driven in generally opposite directions on said guide means of said first and second lift tables.

3. The bi-directional transfer mechanism of claim 2 wherein said conveying member is endless.

4. The transfer mechanism of claim 2 wherein each of said guide means comprises a plurality of rotatable idler wheels.

5. The transfer mechanism of claim 4 wherein the upper extent of said idler wheels located on said respective lift tables define a generally planar surface and wherein the axes of rotation of said wheels are parallel.

6. The transfer mechanism of claim 2 wherein said lift tables can be independently positioned.

7. The transfer mechanism of claim 2 wherein said drive shaft drives a second shaft, and wherein said conveying member is further reeved around said second shaft.

8. The transfer mechanism of claim 7 wherein said second shaft is parallel to said drive shaft.

9. The transfer mechanism of claim 8 wherein each of said guide means comprises a plurality of rotatable idler wheels, the upper extent of said idler wheels located on said respective lift tables defining a generally planar surface and said idler wheels having parallel axes of rotation.

10. The transfer mechanism of claim 9 wherein said lift tables can be independently positioned.

11. The transfer mechanism of claim 10 wherein said selective positioning means comprises a pneumatic lift.

12. A bi-directional transfer mechanism for use with a live roller line shaft conveyor having a drive shaft comprising:
frame means;
first and second independently displaceable lift tables mounted for vertical movement on said frame means, each of said lift tables having means for guiding an endless elastomeric conveying member mounted thereon;

said endless elastomeric conveying member being driven by the drive shaft of the conveyor and operatively engaging said guide means of said first and second lift tables, said endless elastomeric conveying member being reeved around said guide means and said drive shaft such that the portion of said conveying member operatively associated with said guide means of said first lift table is driven in one direction on said guide means of said first lift table and the portion of said conveying member operatively associated with the guide means of said second lift table is driven in a different direction on said guide means of said second lift table;

means for selectively positioning said first and second lift tables with respect to each other between respective article transfer and non-transfer positions, whereby one of said lift table guide means is located in said article transfer position such that the portion of said endless elastomeric conveying member operatively engaging said one of said lift table guide means is raised above the conveying surface of said conveyor, while the other of said lift table guide means is located in said article non-transfer position such that the portion of said endless elastomeric conveying member operatively engaging said other of said lift table guide means is positioned below said conveying surface.

13. The transfer mechanism of claim 12 wherein said endless elastomeric conveying member is positioned perpendicular to the flow of articles on said conveying surface.

14. The transfer mechanism of claim 12 wherein each of said guide means comprises a plurality of rotatable idler wheels.

15. The transfer mechanism of claim 14 wherein the upper extent of said idler wheels located on said respective lift tables define a generally planar surface and wherein the axes of rotation of said wheels are parallel.

16. The transfer mechanism of claim 15 wherein said lift tables can be independently positioned.

17. The transfer mechanism of claim 16 wherein said endless elastomeric conveying member is further reeved around a second shaft.

18. The transfer mechanism of claim 17 wherein said second shaft is parallel to said conveyor drive shaft.

19. The transfer mechanism of claim 18 wherein said guide means comprises a plurality of rotatable idler wheels, the upper extent of said idler wheels located on said respective lift tables defining a generally planar surface and having parallel axes of rotation.

20. A conveyor system comprising:
first conveyor means for transporting and accumulating a plurality of articles along a first pass line, said first conveyor means having a drive shaft;
second conveyor means for transporting and accumulating a plurality of articles along a second pass line different from said first pass line;
a bi-directional transfer mechanism for transferring said articles between said first conveyor means and said second conveyor means;
said transfer mechanism comprising:
frame means;
first and second lift tables mounted for vertical movement on said frame means, each of said lift tables having means for guiding an endless conveying member mounted thereon;
said endless conveying member being driven by said drive shaft and operatively engaging said guide means of said first and second lift tables, said endless conveying member being reeved around said guide means and said drive shaft such that the portion of said conveying member operatively associated with said first lift table is driven in one direction on said guide means of said first lift table and the portion of said conveying member operatively associated with said second lift table is driven in a different direction on said guide means of said second lift table during operation of said first conveyor means;

means for selectively positioning said first and second lift tables with respect to each other between respective article engaging and non-engaging positions, whereby one of said lift table guide means is located in said article engaging position such that the portion of said endless conveying member operatively engaging said one of said lift table guide means is raised above the conveying surface of said first conveyor means, while the other of said lift table guide means is located in said article non-engaging position such that the portion of said endless conveying member operatively engaging said other of said lift table guide means is positioned below said conveying surface of said first conveyor means.

21. The conveyor system of claim 20 wherein the portions of said endless conveying member operatively associated with said first and second lift tables are driven in generally opposite directions on said guide means of said first and second lift tables.

22. The conveyor system of claim 21 wherein each of said guide means comprises a plurality of rotatable idler wheels.

23. The conveyor system of claim 22 wherein the upper extent of said idler wheels located on said respective lift tables define a generally planar surface and wherein the axes of rotation of said wheels are parallel.

24. The conveyor system of claim 23 wherein said lift tables can be independently positioned.

25. The conveyor system of claim 20 further comprising a second shaft rotatably mounted on said first conveyor means, said endless conveying member being further reeved around said second shaft.

26. The conveyor system of claim 25 wherein said second shaft is parallel to said drive shaft.

27. The conveyor system of claim 26 wherein said guide means comprises a plurality of rotatable idler wheels, the upper extent of said idler wheels lcoated on said respective lift tables presenting a generally planar surface and said idler wheels having parallel axes of rotation.

28. The conveyor system of claim 27 wherein said lift tables can be independently displaced.

* * * * *